(12) United States Patent
Cohen et al.

(10) Patent No.: US 8,073,046 B2
(45) Date of Patent: Dec. 6, 2011

(54) FAST TRAINING EQUALIZATION OF A SIGNAL BY USING ADAPTIVE-ITERATIVE ALGORITHM WITH MAIN PATH PHASE CORRECTION

(75) Inventors: Yossef Cohen, Nesher (IL); Eshel Hason, Nesher (IL); Noam Galperin, Ma'a lot (IL)

(73) Assignee: Zoran Corporation, Sunnyvale, CA (US)

( * ) Notice: Subject to any disclaimer, the term of this patent is extended or adjusted under 35 U.S.C. 154(b) by 1090 days.

(21) Appl. No.: 11/820,006

(22) Filed: Jun. 14, 2007

(65) Prior Publication Data

US 2008/0310493 A1    Dec. 18, 2008

(51) Int. Cl.
*H03H 7/30* (2006.01)
*H03H 7/40* (2006.01)
*H03K 5/159* (2006.01)

(52) U.S. Cl. .................... 375/232; 375/230; 375/231

(58) Field of Classification Search .............. 375/232
See application file for complete search history.

(56) References Cited

U.S. PATENT DOCUMENTS

| | | | |
|---|---|---|---|
| 5,263,052 A | 11/1993 | Borth et al. | |
| 6,047,023 A * | 4/2000 | Arnstein | 375/229 |
| 6,249,321 B1 * | 6/2001 | Bae et al. | 348/614 |
| 6,314,131 B1 | 11/2001 | Roe et al. | |
| 6,320,901 B1 * | 11/2001 | Arad et al. | 375/222 |
| 6,377,312 B1 | 4/2002 | Limberg et al. | |
| 6,559,894 B2 | 5/2003 | Omura et al. | |
| 6,693,958 B1 | 2/2004 | Wang et al. | |
| 7,050,491 B2 | 5/2006 | McDonald et al. | |
| 7,177,354 B2 | 2/2007 | Fimoff et al. | |
| 7,203,257 B2 | 4/2007 | Fimoff et al. | |
| 7,602,444 B2 | 10/2009 | Cheon et al. | |
| 2002/0181611 A1 * | 12/2002 | Kim | 375/296 |
| 2003/0081704 A1 * | 5/2003 | Kim | 375/343 |
| 2003/0152170 A1 * | 8/2003 | Yousef | 375/340 |
| 2003/0231709 A1 | 12/2003 | Pare, Jr. et al. | |
| 2004/0234009 A1 | 11/2004 | Fimoff et al. | |
| 2005/0123034 A1 | 6/2005 | Lee et al. | |
| 2005/0123074 A1 | 6/2005 | Kim et al. | |
| 2005/0123075 A1 | 6/2005 | Kim et al. | |
| 2005/0163209 A1 | 7/2005 | Fimoff et al. | |
| 2005/0180558 A1 | 8/2005 | Zhang | |

(Continued)

FOREIGN PATENT DOCUMENTS

EP    1014635 A2    6/2000

OTHER PUBLICATIONS

"Linear and Non-Linear Adaptive Correction Techniques for DTV Transmitters," 2002 Axcera, LLC, Lawerence, PA, www.axcera.com, pp. 1-4.

(Continued)

*Primary Examiner* — David C. Payne
*Assistant Examiner* — Erin File
(74) *Attorney, Agent, or Firm* — Dickstein Shapiro LLP

(57) ABSTRACT

A signal receiver inputs a signal, computes a set of equalizer tap values during a signal acquisition phase by applying an algorithm iteratively to a given set of training data contained within the signal, and uses the set of equalizer tap values to perform signal equalization during the signal acquisition phase. The algorithm includes computing and applying phase correction to the pre-equalized signal at each adaptation step to correct for phase error related to the main path only, of the input signal.

29 Claims, 11 Drawing Sheets

U.S. PATENT DOCUMENTS

| | | |
|---|---|---|
| 2006/0039460 A1* | 2/2006 | Fimoff et al. ............... 375/233 |
| 2006/0078072 A1 | 4/2006 | Cheon et al. |
| 2006/0114981 A1* | 6/2006 | Ghosh et al. ............... 375/232 |
| 2007/0030930 A1* | 2/2007 | Yousef ............... 375/346 |
| 2007/0189373 A1* | 8/2007 | Pietraski et al. ............... 375/232 |
| 2008/0240293 A1* | 10/2008 | Kim et al. ............... 375/316 |
| 2011/0007223 A1* | 1/2011 | Kim et al. ............... 348/726 |

OTHER PUBLICATIONS

Al-Dhahir, Naofal M.W. et al., "MMSE Decision Feedback Equalizers: Finite-Length Results," NSF contract No. NCR-9203131, JSEP contract No. DAAL03-91-C-0010, NASA contract No. NAG2-842, presented at ASILOMAR '93, pp. 1-27.

Baek, Jong-Seob, et al., "Channel Estimation-based Equalization Technique for 8-VSB DTV System in Multi-path Channel," 2.4-11, Samsung Electronics Co, Suwon, 442-742, Korea, 0-7803-8838-0/05, 2005 IEEE, pp. 87-88.

Citta, Richard, et al., "ATSC Transmission System: VSB Tutorial," Jun. 12, 1997, Citta & Sgrignoli: VSB Transmision System Tutorial, Montreuz Symposium, Symposium Handouts, Zenith Electronics Corporation, pp. 1-17.

Kim, Byoung-Jo Jay, "Blind Equalization for Short Burst Wireless Communications," Dissertation submitted to the Department of Electrical Engineering and the Committee on Graduate Studies, Jan. 1998.

Kim, Jong-Moon, "Fast Initialization of Equalizers for VSB-Based DTV Transceivers in Multipath Channel," IEEE Transactions on Broadcasting, vol. 51, No. 1, Mar. 2005, 0018-9316, pp. 133-138.

Bretl, Wayne et al., "VSB Modern Subsystem Design for Grand Alliance Digital Television Receivers," IEEE Transactions on Consumer Electronics, Aug. 1995, 41(3):773-786.

Haykin, Simon, ed. Adaptive Filter Theory. Englewood Hills, NJ, Prentice-Hall, 1991, title page, publication information page, pp. 31-36, 69-70, 302-304.

Official Communication for U.S. Appl. No. 11/518,077, Mailed on Jun. 18, 2009.

Official Communication for U.S. Appl. No. 11/518,077, Mailed on Feb. 18, 2010.

Official Communication for U.S. Appl. No. 11/518,077, Mailed on Apr. 28, 2010.

Official Communication for U.S. Appl. No. 11/518,077, Mailed on Jun. 8, 2010.

* cited by examiner

FAST TRAINING EQUALIZATION OF A SIGNAL BY USING ADAPTIVE-ITERATIVE ALGORITHM WITH MAIN PATH PHASE CORRECTION

FIELD OF THE INVENTION

At least one embodiment of the present invention pertains to training equalization of a signal and, more particularly, to fast training equalization of a vestigial sideband (VSB) signal.

BACKGROUND

In a Digital Television (DTV) system, the signal at the receiver often includes distortions introduced by the transmitter, the transmission channel and/or the receiver itself. Consequently, DTV receivers normally include an equalizer to remove linear distortions. The equalizer may be an adaptive equalizer, i.e., one which employs an equalizer adaptation method that is responsive to the differences ("error information") between the equalizer's output and the transmitted DTV signal. The error information is calculated by subtracting the equalizer output from the received signal. An adaptive equalizer typically has taps with tap weights (coefficients). Adapting the equalizer involves calculating and repeatedly recalculating the tap coefficients.

The DTV signal reception process can be divided into two phases: signal acquisition and signal tracking. During the tracking phase, which is the phase after the system has solidly acquired the DTV signal, equalizer adaptation is "blindly" maintained by the use of Viterbi decoder "soft decisions". Soft-decision Viterbi decoders maintain a history of many possible transmitted sequences, building up a view of their relative likelihoods and finally selecting the value of logic 0 or 1 for each bit according to which has the maximum likelihood. Viterbi soft decisions are 8-VSB constellations which are mapped from the corresponding Viterbi decoded bits.

During the acquisition phase, which is the period of time when Viterbi decoder decisions are not yet reliable, a training sequence is often used to initiate the adaptive equalizer. For example, the 8-VSB Advanced Television Systems Committee (ATSC) signal employed by the United States' ATSC digital television system includes a Data Field Sync (DFS) training signal, whose length is 820 symbols. This DFS training signal is repetitively transmitted every 313 DTV segments. Prior art solutions employ the DFS training signal to initiate the adaptive equalizer during the training signal period. However, in the presence of severe multi-path conditions, the training signal period is often too short for the equalizer to converge to a correct solution. This results in an unsuccessful transition between the acquisition phase and the tracking phase using Viterbi decoder soft decisions to drive equalizer adaptation.

There are two major approaches to carrier/phase synchronization: According to the first approach, carrier synchronization is done before equalization. In prior art solutions, the phase error upon which the carrier is tracked includes terms relating to all signal paths, i.e., the main path and all ghost paths. The main path is the specific signal path to which the equalizer aims to synchronize. A ghost path is any signal path other than the main path. As a result, in strong multi-path conditions, the channel impulse response (CIR) portrayed to the equalizer may be very hard to cancel.

According to the second approach, the phase tracking error is based upon the equalizer's output, which means that its integrity depends on the equalizer's convergence, and so in strong multi-path conditions, this approach can be used for tracking only.

SUMMARY OF THE INVENTION

The present invention includes a method which comprises inputting a pre-equalized signal, and computing a set of equalizer tap values during a signal acquisition phase by applying an algorithm iteratively to a given set of training data contained within the signal. Applying the algorithm iteratively to the set of training data includes performing multiple adaptation steps, and applying a phase correction to the pre-equalized signal at each of the adaptation steps to correct for phase error related to the main path only. The method further includes using the set of equalizer tap values to perform signal equalization during the signal acquisition phase.

The present invention further includes an apparatus, such as a signal equalizer, which can perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
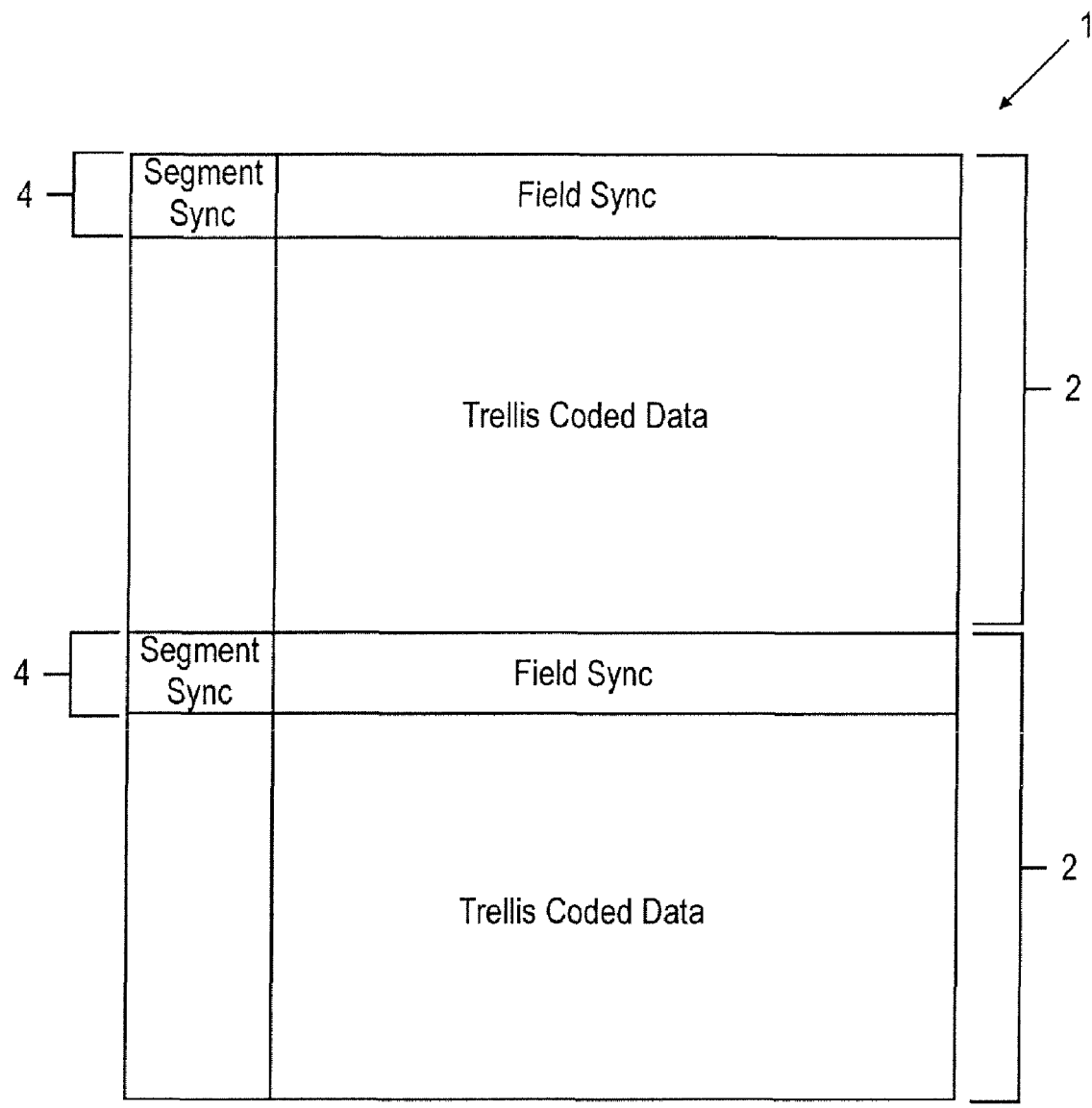
FIG. 1 illustrates the format of an ATSC DTV frame.

A method and apparatus are described for fast training equalization of a VSB signal, by using an adaptive-iterative algorithm with main path phase correction. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As described in greater detail below, the technique introduced here includes adapting an equalizer in a VSB receiver during signal acquisition, including adaptively calculating a set of tap values for the equalizer, by applying a least mean squares (LMS) algorithm iteratively to a given set of training data in the VSB signal. This provides very fast adaptation of the equalizer without sacrificing accuracy. Note that in other embodiments of the invention, an algorithm other than LMS may be used. The technique includes computing and applying a phase correction to the pre-equalized signal at each adaptation step to correct for phase error related to the main path only, of the input signal. The given set of training data to which the algorithm is iteratively applied can be, for example, a training sequence from a single segment of the VSB signal, or an average of training sequences from two or more segments of the VSB signal. In addition, during signal tracking phase, the algorithm can be applied iteratively to a set of Viterbi decoder soft decisions in a similar manner.

In the technique introduced here, the equalizer is initiated in a "one shot" manner, based on the training signal information, without the need for a longer training signal, even in the presence of severe multi-path conditions. This is made possible by using a background process of several LMS iterations for each adaptation step, such that the effective training signal period and/or rate is increased.

The technique can be used in digital 8-VSB ATSC transmission based on the DFS signal. Its approach of adaptive-iterative LMS-DFE can be implemented for the duration of an entire VSB field, during which time the role of the training signal is executed by the Viterbi decisions. Thus, this new concept utilizes the simplicity and numerical robustness of the LMS algorithm, but is able to give the performance level of more complex methods such as the Training MMSE-DFE described by Al-Dhahir.

In addition, the new concept enables the equalizer to select and lock onto a specific signal path. This capability is important, especially in the presence of multiple, strong channel echoes. The input signal at a receiver has a "main path" and, if a multi-path condition exists, one or more "ghost paths". The main path is the specific signal path to which the equalizer aims to synchronize. A ghost path is any signal path other than the main path. Any significant path can be selected as the main path, by updating the equalizer according to the error between the data related to this path and the equalizer's output. As noted above, the technique introduced here further improves performance by providing the ability to perform a preliminary phase correction at the beginning of each adaptation step (i.e., based on the pre-equalized signal), to correct for phase error related to the main path only. Unlike phase correction based on the equalized signal, this method does not require equalizer convergence (the correction is performed according to pre-equalized data), so it can be used during the channel acquisition phase. It is also superior to the prior art methods of correcting the phase error before equalization (e.g., pilot based), which incorporates the phase errors relative to all signal paths. In this way, the cancellation of the channel multi-path and the phase is separated between the phase correction and the equalizer and the CIR portrayed to the equalizer is easier to cancel by way of faster equalization time and shorter equalizer required.

The technique introduced here enables better quality terrestrial reception of VSB DTV in the presence of severe multi-path echoes. Severe multi-path echoes often occur when a "rabbit ear" antenna is used for indoor reception of terrestrial broadcast signals. The technique introduced here significantly mitigates the negative effects of strong multi-path echoes.

Note that while this description focuses on VSB DTV systems, the concept introduced here is not limited to use in a VSB system or a DTV system.

Refer now to FIG. 1, which shows the format of an ATSC DTV frame. The ATSC DTV signal uses a 12-phase trellis coded 8-level VSB (usually referred to as 8T-VSB or 8-VSB) as the modulation method. Each frame 1 contains two data fields 2, each data field 2 contains 313 segments 4, and each segment 4 contains 832 symbols. The first four symbols in each segment are segment synchronization ("Segment Sync") symbols that have a known, predefined sequence.

Figure 2:
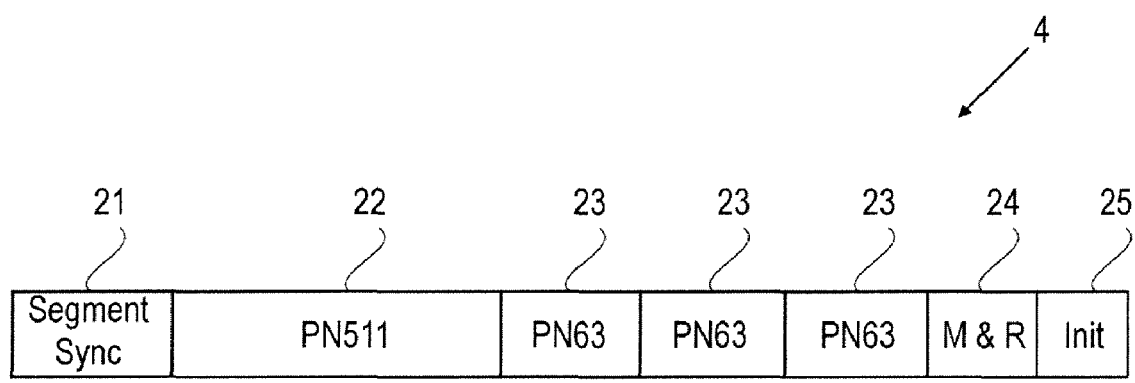
FIG. 2 illustrates the format of a Field Sync segment.

The first segment 4 in each field 2 is a field synchronization ("Field Sync") segment. As shown in FIG. 2, a Field Sync segment comprises four Segment Sync symbols 21 followed by a pseudorandom noise sequence 22 having a length of 511 symbols (PN511), which is followed by three pseudorandom noise sequences 23 each having a length of 63 symbols (PN63). In alternate fields, the three PN63 sequences 23 are identical; in the remaining fields, the center PN63 sequence is inverted. The pseudorandom noise sequences 22 and 23 are followed by 128 symbols, which include 116 mode and reserved symbols 24 and 12 trellis initialization symbols 25.

Because the first 704 symbols of each Field Sync segment 4 are known, these symbols, as discussed above, may be used as a training sequence for an adaptive equalizer. All of the three PN63 sequences 23 can be used only when the particular field being transmitted is detected so that the polarity of the center sequence is known. The remaining data in the other 312 segments comprises trellis coded 8-VSB symbols.

Figure 3:
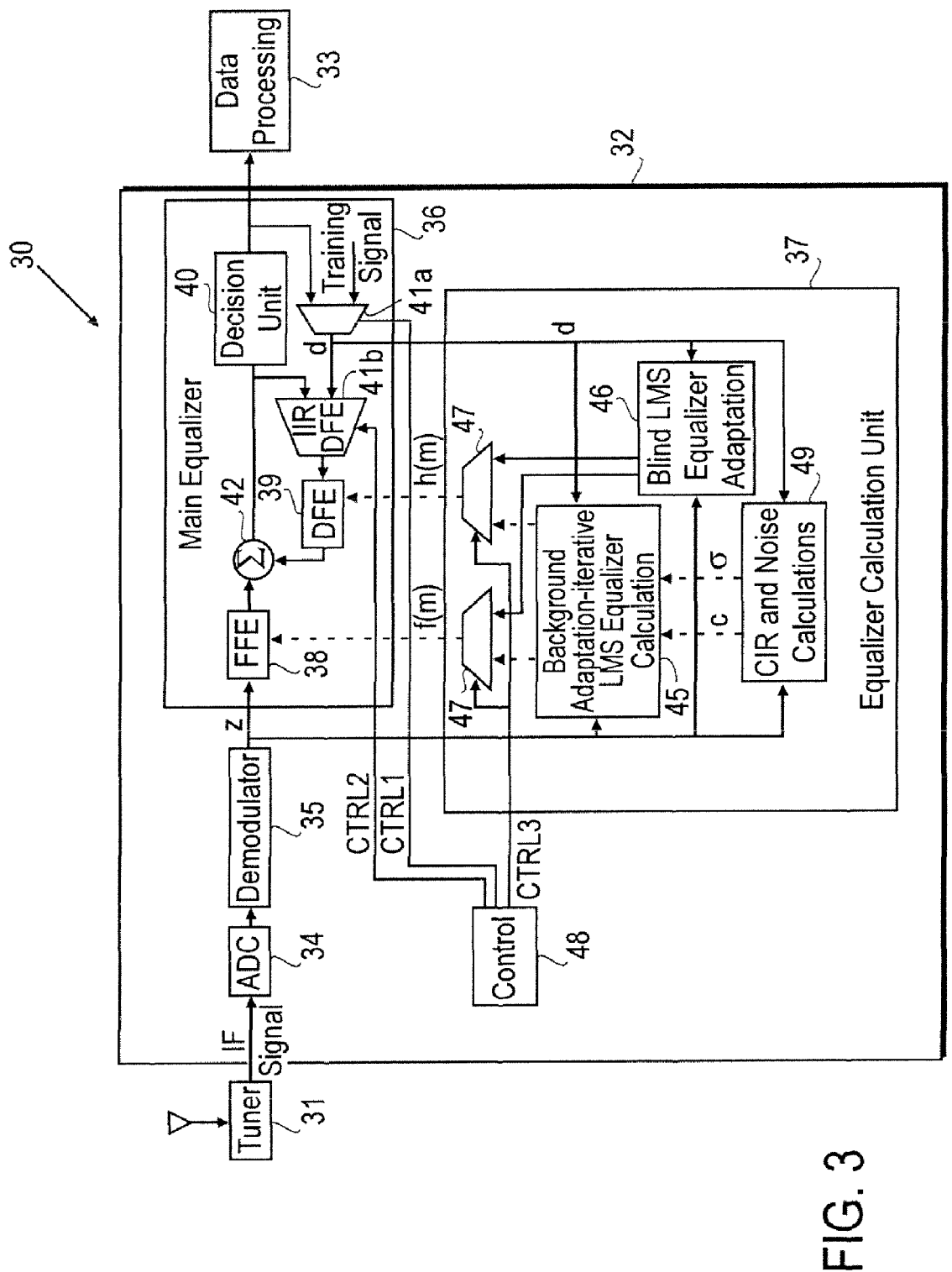
FIG. 3 is a block diagram of a VSB receiver according to an embodiment of the invention.

FIG. 3 shows an example of a VSB receiver that can implement the technique introduced here. The receiver 30 includes a tuner 31, a signal processing stage 32, and a data processing stage 33. The tuner 31 receives the VSB signal and converts it to a standard intermediate frequency (IF) signal (e.g., 44 MHz), which is provided to the signal processing stage 32. The signal processing stage 32 performs various types of signal processing, including analog-to-digital (A/D) conversion, demodulation and (as described further below) adaptive equalization. The output of the signal processing stage 32 is provided to a data processing stage 33, which performs well-known DTV data processing functions that are not germane to the technique introduced here.

The signal processing stage 32 includes an analog-to-digital converter (ADC) 34, a demodulator 35, a main equalizer unit 36, and an equalizer calculation unit 37 and a control unit 48. The ADC 34 receives the IF signal output by the tuner 31 and outputs a digitized version of that signal to the demodulator 35. The demodulated signal output by the demodulator 35 is provided to the main equalizer unit 36 and to the equalizer calculation unit 37. The output of the main equalizer unit 36 is provided to the data processing stage 33.

The Main Equalizer unit 36 includes a Feed Forward Equalizer (FFE) 38 and a Decision Feedback Equalizer (DFE) 39. The FFE 38 and the DFE 39 are adapted over time to the dispersive channel through which the data has been transmitted, to correct the inter-symbol interference distorting the transmitted bit-stream due to the channel impulse response. The Main Equalizer unit 36 further includes a Viterbi decision unit 40, multiplexers 41a and 41b, and a summer 42. The output of the Viterbi decision unit 40 is the main output of the Main Equalizer unit 36.

Multiplexer 41a determines what signal is used as the training/decision unit selection reference signal, i.e., the training signal or the output of the Viterbi unit 40. Multiplexer 41b controls the choice of DFE/IIR configuration; when the selected input of multiplexer 41b is signal d, the Main Equalizer unit 36 operates as a DFE; whereas when the selected input of multiplexer 41b is the input signal of the Viterbi decision unit 40, the Main Equalizer unit 36 operates as an IIR. Input selection of multiplexers 41a and 41b is controlled by control signals CTRL1 and CTRL2 from control unit 48. Control unit 48 may be (or may include), for example, one or more programmable general-purpose or special-purpose microprocessors or digital signal processors (DSPs), microcontrollers, application specific integrated circuits (ASICs), programmable logic devices (PLDs), or a combination of such devices.

The Equalizer Calculation Unit 37 determines the best tap coefficients for the FFE 38 and DFE 39 to use in their task of correcting the channel distortion and implements the technique introduced here. In particular, the Equalizer Calculation Unit 37 implements the Adaptive-Iterative LMS algorithm to calculate the tap coefficients. The Equalizer Calculation Unit 37 includes a Background Adaptive-Iterative LMS calculator 45, a Blind LMS calculator 46, two multiplexers 47 and a CIR c and noise σ calculation unit 49.

The Equalizer Calculation Unit 37 has two modes of operation: acquisition mode and tracking mode. Acquisition mode is used when initializing the system operation from a condition in which there is no lock on the signal. Tracking mode is used thereafter (when there is a lock on the signal) to maintain system operation under time varying conditions. In acquisition mode, the Equalizer Calculation Unit 37 provides the Main Equalizer Unit 36 with FFE and DFE coefficients determined by the Background Adaptive-Iterative LMS calculator 45 at the time of system initialization. Thereafter, in tracking mode the Equalizer Calculation Unit 37 provides the Main Equalizer unit 36 with FFE and DFE coefficients determined by the Background Adaptive-Iterative LMS calculator 45 as well as coefficients determined by the Blind LMS calculator 46. Multiplexers 47 determine whether the output of the Background Adaptive-Iterative LMS calculator 45 or the output of the Blind LMS calculator 46 is used. Input selection of multiplexers 47 is controlled by a control signal CTRL3 from control unit 48.

The Blind LMS calculator 46 can have a construction and manner of operation such as is well known in the art. The Background Adaptive-Iterative LMS calculator 45 operates by modeling the operation of the channel and the Main Equalizer unit 36, using a series of samples of the received data stream (where each series of samples is called an "adaptation step" or simply "adaptation") to iteratively refine the estimate of the correct coefficients to be used to initialize the FFE and DFE at acquisition time. At each adaptation step, the Background Adaptive-Iterative LMS calculator 45 runs successive iterations of the LMS algorithm on each of the samples received, progressively increasing the accuracy of the estimate. When a predetermined number of adaptation steps have been processed, or when a certain threshold or thresholds of quality have been achieved, the Main Equalizer unit 36 is initialized with the estimated coefficients, and the mode of operation is switched from acquisition mode to tracking mode.

The Main Equalizer unit 36 can be initialized based on samples of the received training signal in the ATSC A-53 8-VSB format and updated by using Viterbi decisions information. There are at least two possible embodiments of the Adaptive-Iterative technique introduced here, both of which are described below in detail. In a first embodiment, the Main Equalizer unit 36 is initialized and updated based on the calculated Channel Impulse Response (CIR) c and the estimated noise variance σ, using a locally generated impulse or other flat spectrum reference signal ref as stimulus for the channel-equalizer model. The CIR c and σ are pre-calculated based on the received training signal at each adaptation step. Initialization of the Main Equalizer unit 36 is achieved based on a comparison of the reference sequence processed through the channel-equalizer model and the reference sequence itself.

In a second embodiment, direct initialization of the Main Equalizer unit 36 is achieved based on a comparison of the received training signal z processed through the equalizer model and the a priori known training sequence d (i.e., not based on the CIR). The received training signal is updated at each adaptation step.

Both embodiments can use as the training signal any one of the following options based on the ATSC A-53 8-VSB data format: PN511, PN63, or both PN511 and PN63 (see FIG. 2). Both embodiments may use the training signal or the Viterbi decisions as the reference signal d for the Adaptive-Iterative calculation block (described further below), by controlling the multiplexer 41a. By controlling multiplexer 41b, both embodiments can configure the Main Equalizer unit 36 as a DFE or as an Infinite Impulse Response (IIR) filter, as noted above. Both embodiments can switch between the adaptive-iterative method introduced here and the traditional LMS method, by controlling multiplexers 47. In addition, the received training signal z collected during consecutive DFS periods may be averaged over multiple fields to attenuate the channel noise.

Both embodiments can work during acquisition phase and tracking phase. Both embodiments can operate in training equalization mode, during DFS transmission. Further, both embodiments can operate in blind equalization mode, during data transmission. In the first embodiment, the received training signal z or the CIR c may be averaged in training equalization mode and the CIR c may be averaged in blind equalization mode. In the second embodiment, the received training signal z may be averaged in training equalization mode.

Both embodiments employ a number N of adaptation steps, where each adaptation step includes a maximum number J of iterations as follows: In each adaptation step n, the signal z is the last received signal or the average of the last received training signals. The signal z and the calculated CIR c remain constant during the entire adaptation step. Each adaptation step uses a programmable maximum number J of LMS iterations to calculate the FFE and DFE equalizer tap coefficients.

In the first embodiment, the calculated CIR c can be used to select the optimal equalizer FFE and DFE mutual coverage and the specific signal path to lock on. This can be done by extracting CIR information such as maximum signal path and CIR delay spread. This capability is advantageous, especially in the presence of multiple strong echoes.

The first and second embodiments will now be described in greater detail with reference to FIGS. 4-6.

First Embodiment

In the first embodiment, the equalizer calculation is based on a pre-calculated CIR c and noise variance a at each adaptation step. The CIR solution c can be initiated/updated from the received training signal z and from the training-signal/Viterbi-decisions d by using, for example, the Least-Squares technique described in Kim J. and Lee Y., "Fast Initialization of Equalizers for VSB-Based DTV Receivers in Multi-path Channel", *IEEE Trans. Comm.*, vol. 51, no. 1, March 2005, which is incorporated herein by reference.

Based on the estimated cir c, the noise variance $\sigma^2$ is estimated as:

$$\sigma^2 = \text{mean}\{\|z - z_{est}\|^2\}, \text{ where } z_{est} = \{d^*c\},$$

and where c is the calculated CIR, z is the received signal, d is the training signal or the Viterbi decisions (output of the Viterbi decoder), and "*" represents the convolution operation.

Given the CIR solution c, the equalizer FFE and DFE coefficients are calculated, such that the overall response including the CIR and the equalizer is as close as possible to an impulse, i.e., the equalizer output symbols are close as possible to the transmitted symbols, and the output signal-to-noise ratio (SNR) is maximized.

Figure 4:
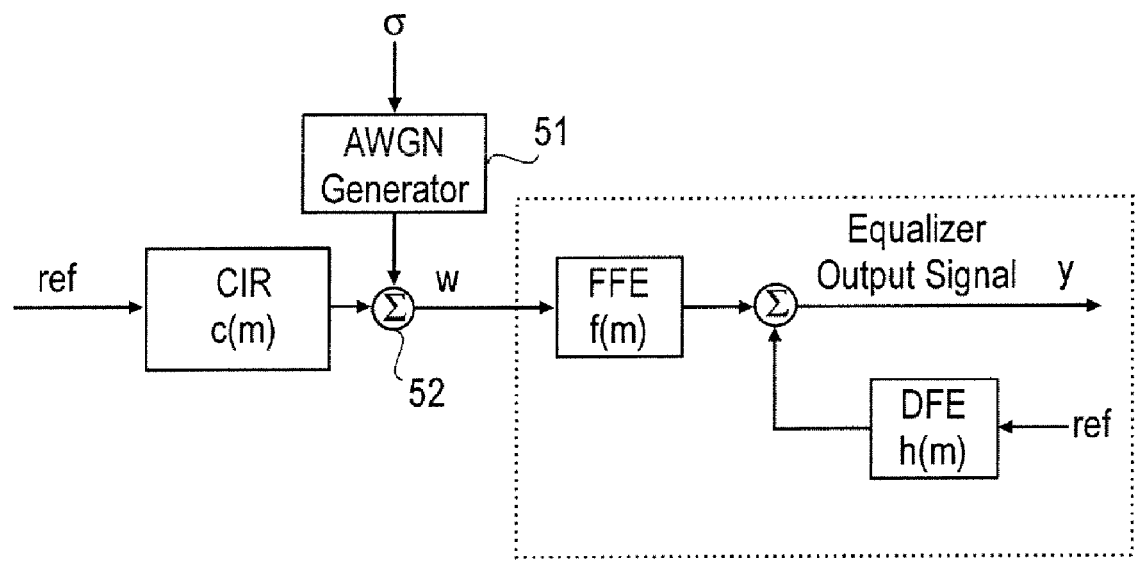
FIG. 4 is a block diagram showing the functionality of the Background Adaptive-Iterative LMS calculator according to a first embodiment of the invention.

FIG. 4 illustrates the functionality of the Background Adaptation-Iteration LMS Calculator 45 according to the first embodiment. In each adaptation, the same reference signal ref is used as input to the CIR. The CIR input signal ref may be an impulse function or any flat spectrum signal. Using an impulse function simplifies the LMS iterations calculations, since the DFE coefficients by themselves are added to the FFE output, and since the CIR output samples are the CIR coefficients. The Additive White Gaussian Noise (AWGN) generator 51 improves the equalizer solution by taking into account the AWGN level in the background-LMS calculations. Note that the AWGN generator 51 is optional, i.e., the noise signal noise ($\sigma$) may not be applied to summer 52.

In each adaptation, the noisy channel impulse response signal w is calculated as w=ref*c+noise($\sigma$); note that neither w nor $\sigma$ is changed during the entire adaptation step n. In each adaptation step 'n', the calculated equalizer taps at the final iteration are the initial conditions for the next adaptation step n+1. In each adaptation, the LMS iterations are stopped when the norm of $e_j$=ref-$y_j$ is smaller than a predefined threshold, trs, or when j=J, where $y_j$ is the output at the jth iteration and J is the predefined number of iterations.

Figure 5:
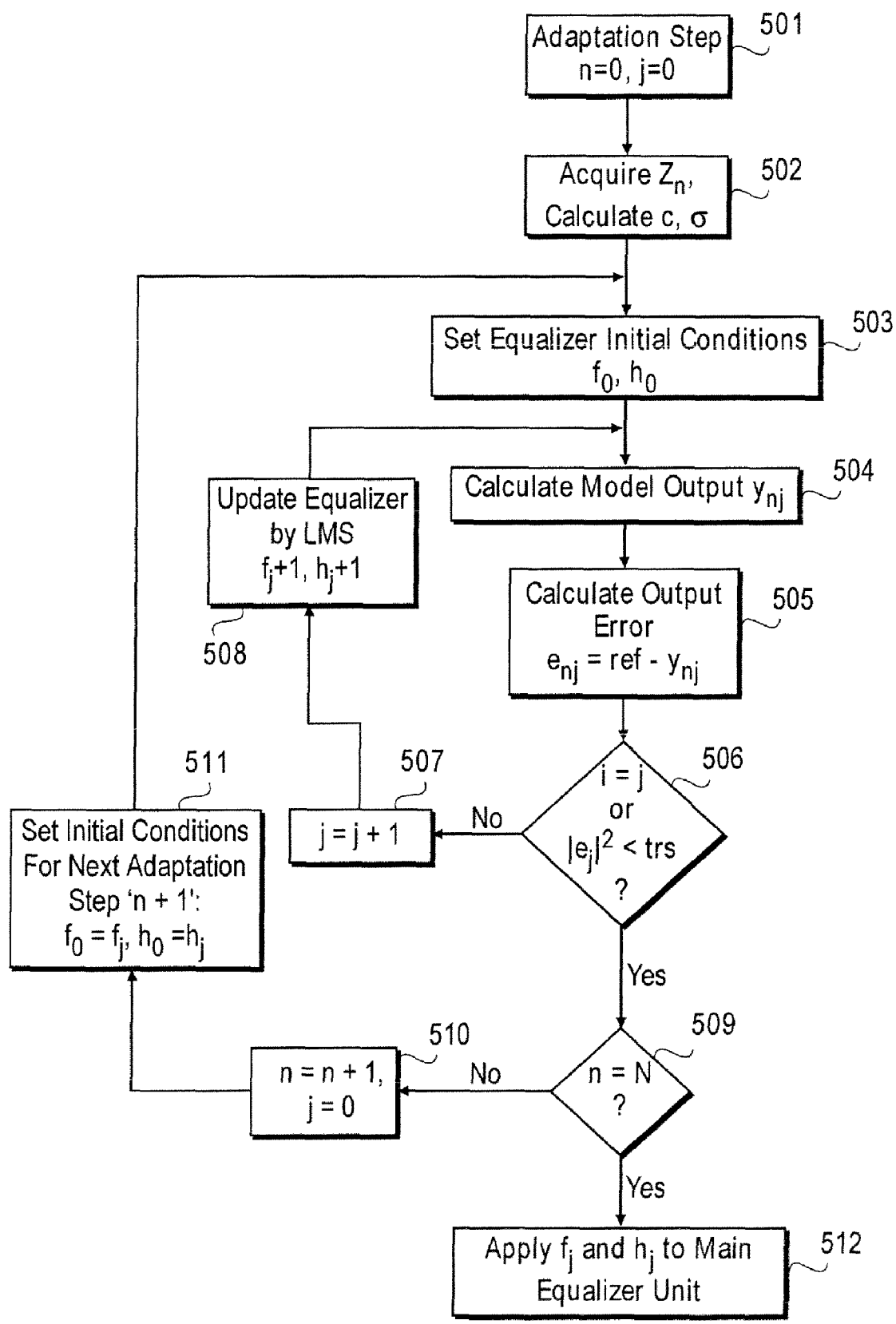
FIG. 5 is a flow diagram showing the iterative equalizer adaptation process of the receiver, according to the first embodiment of the invention.
Figure 6:
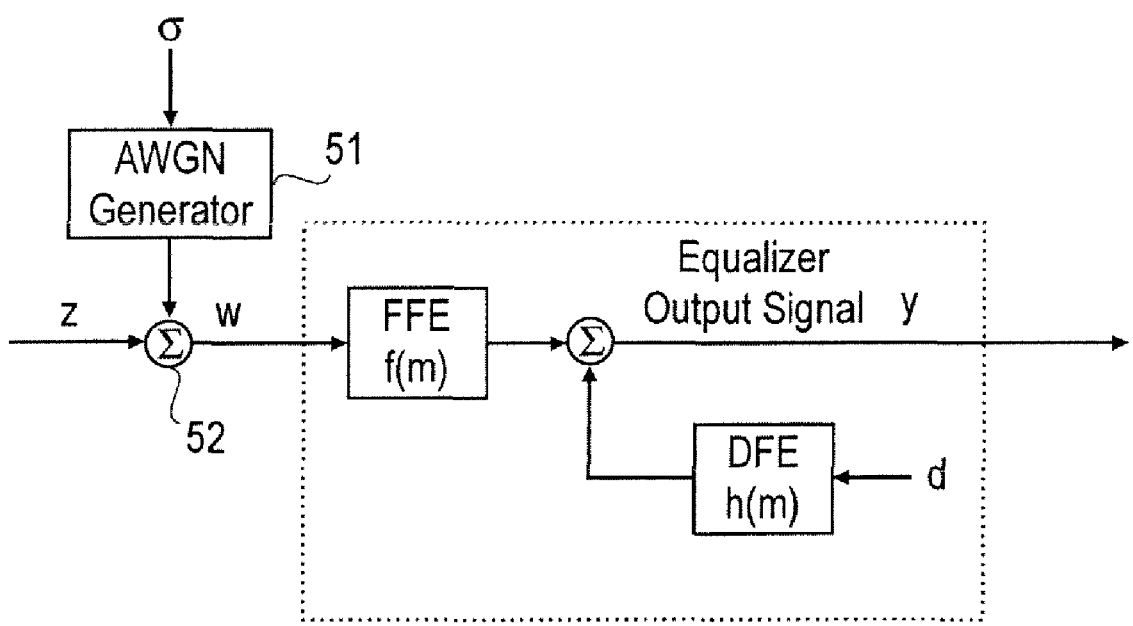
FIG. 6 is a block diagram showing the functionality of the Background Adaptive-Iterative LMS calculator according to a second embodiment of the invention.

FIG. 5 illustrates this process, as will now be further described (assuming that ref is an impulse function). The process begins at 501 by initializing the adaptation step n and the iteration j at n=0 and j=0. At 502 an adaptation begins with the process of acquiring the signal z, calculating the CIR, c, and the noise variance, $\sigma$. At 503 the process sets equalizer taps initial conditions $f_0$ and $h_0$ (for the nth adaptation), where $f_j$ is the FFE coefficient and $h_j$ is the DFE coefficient, as defined below.

Operations 502 through 511 in FIG. 5 are performed for each adaptation 'n', while n<N (where N is the predefined maximum number of adaptation steps). Further, operations 504 through 508 are performed for each iteration 'j', until either j=J (where J is the predefined maximum number of iterations) or $|e_j|^2$<trs.

At 504 the process calculates the model output signal $y_{nj}$ as $y_j(k)=\{w*f_j\}(k)+h_j(k)$ (the reference signal, ref, is assumed to be an impulse, such that the term $\{ref*h_j\}(k)$ becomes simply $h_j(k)$). At 505 the process calculates the output error as $e_j$=ref-$y_j$. Next, if $|e_j|^2 \geq$ trs and j<J at 506, then the process increments j at 507 and updates the equalizer taps at 508 according to the well-known Block-LMS algorithm, as follows:

$$FFE: f_{j+1}(m)=f_j(m)+\mu_f \cdot sum\{w(k-m) \cdot e_j(k)\},$$

$$DFE: h_{j+1}(m)=h_j(m)+\mu_h \cdot sum\{ref(k-m) \cdot e_j(k)\},$$

where $\mu_h$ and $\mu_f$ are the LMS step size of the DFE and the FFE, respectively.

Otherwise, if $|e_j|^2$<trs or j=J at 506, then if n<N at 509, then the process stops adaptation step 'n', increments n and reinitializes j to zero at 510, and then sets the initial conditions for the next adaptation step at 511 as:

$$f_0=f_j$$

$$h_0=h_j$$

The process then continues by looping back to 502 as described above.

If, however, n=N at 509 (i.e., it is the final adaptation step), then the process proceeds to 512, where it applies the calculated coefficients $f_j$ and $h_j$ to the FFE and DFE, respectively, in the Main Equalizer unit.

Second Embodiment

In the second embodiment, equalizer calculation is performed directly based on received training signal, i.e., without using the CIR c. FIG. 6 illustrates the functionality of the Background Adaptation-Iteration LMS Calculator 45 according to the second embodiment. Note that the signals z and w=z+noise($\sigma$) are not changed during the whole adaptation step n. Note also that the AWGN generator 51 is optional, i.e., the noise signal noise ($\sigma$) may not be applied to summer 52.

The process for the second embodiment is the same as that for the first embodiment, as illustrated in FIG. 5, with the following exceptions:

1) Since the CIR c is not used in this embodiment, it does not have to be computed at 502.
2) At 504, the model output signal y is computed as $y_{nj}(k)=\{w*f_j\}(k)+\{d*h_j\}(k)$.
3) At 505, the output error e is computed as $e_j$=d-$y_j$
4) At 508, the coefficient h for the DFE is computed as $h_{j+1}(m)=h_j(m)+\mu_h \cdot sum\{d(k-m) \cdot e_j(k)\}$.

Phase Correction

In one embodiment the technique introduced here computes and applies a phase correction to the pre-equalized signal at each adaptation step, to correct for phase error related the main path to only, of the input signal. This phase correction provides improved terrestrial reception in the event of severe multi-path conditions. Such an embodiment is described below in detail with reference to FIGS. 7 through 11.

First, however, considering a discrete baseband model, note that the following notation is used:
ref(t) is the VSB symbol transmitted at discrete time t;
$c_k$ is the kth path's magnitude and phase (complex number) of the channel impulse response (CIR);
$d_k$ is the discrete time delay of the kth path of the CIR;
w(t) is the received VSB signal in at the equalizer's input at time t;
y(t) is the output of the receiver's equalizer at time t; and
D is the delay of the equalizer (equalizer's output versus equalizer's input, meaning, initially, y(t)=w(t-D)).

Therefore, w(t) can be expressed as sum_over_k[$c_k$*ref(t-$d_k$)].

The equalization process aims to bring the error between ref and y to zero. Determining the delay between ref and y also determines the main path of the input signal and vice versa. Therefore, if the equalization process aims to minimize the term (y(t)-ref(t-D-$d_k$))$^2$, then path k is the main signal path; conversely, if path k is the main signal path, then the equalization process aims to minimize the term (y(t)-ref(t-D-$d_k$))$^2$.

Figure 7:
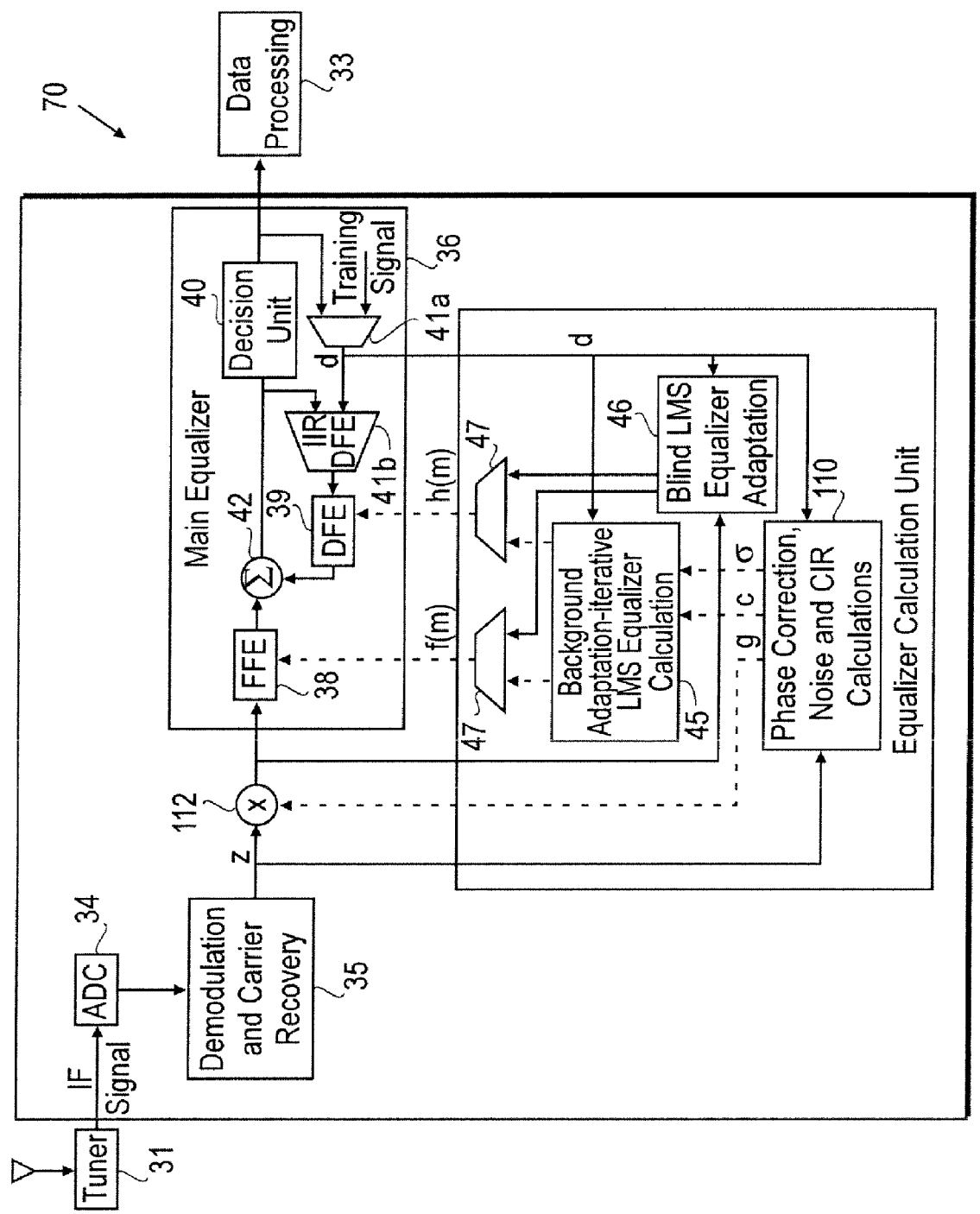
FIG. 7 is a block diagram of a VSB receiver according to a third embodiment of the invention.

Refer now to FIG. 7, which is a block diagram of a VSB receiver according to an embodiment which performs the above-mentioned phase correction. The receiver 70 is essentially the same as receiver 30 in FIG. 3, except that the CIR and noise calculation unit 49 has been replaced by a phase correction, CIR and noise calculation unit 110. Unit 110 performs essentially the same CIR c and noise $\sigma$ calculations that unit 49 does but, in addition, it calculates a phase correction factor g for the main path. The phase correction factor g is output by unit 110 to a multiplier 112, where it is multiplied with the output signal z from the demodulator 35 to produce the input signal to the FFE 38 and the Blind LMS equalizer 46. Note that the control unit 48 and its output signals shown in FIG. 3 are not shown in FIG. 7 to simplify the illustration, though it will be understood that they would be present in the embodiment of FIG. 7.

Figure 11:
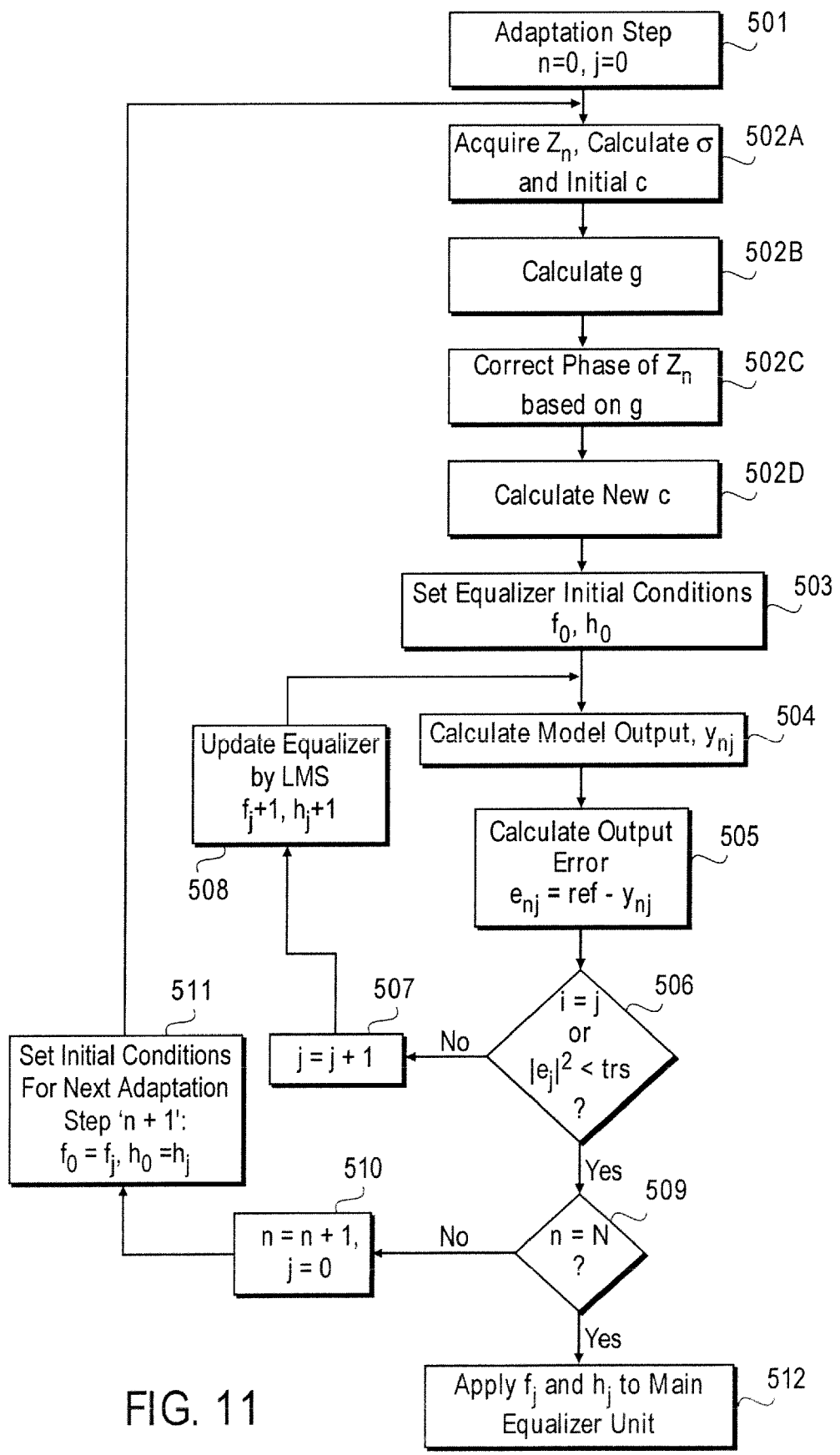
FIG. 11 is a flow diagram showing the iterative equalizer adaptation process of the receiver, according to the third embodiment of the invention.

FIG. 11 is a flow diagram showing the iterative equalizer adaptation process of the receiver 70, which performs the above-described phase correction. The process is essentially the same as that described above in relation to FIG. 5, with the exception that operation 502 in FIG. 5 is replaced by operations 502A through 502D.

At 502A an adaptation step n begins with the process of acquiring the input signal $z_n$, calculating an initial CIR value, $c_1$, and the noise variance, $\sigma$. At 502B the process calculates the phase correction factor, g, for the main path $C_m$ of the input signal $z_n$. In general, the phase correction factor $g=e^{-j\Phi n}$, where $\Phi_n$ is the phase of the main path $C_m$. Several strategies for computing phase correction factor g are described below. At 502C the phase of signal $z_n$ is corrected by rotating it by the phase correction factor g. Note that this phase correction is applied to the input signal before the signal is equalized, i.e., it is applied to the "pre-equalized input signal" $z_n$. The process then calculates a new CIR value, $c_2$, based on the phase-corrected signal $z_n$. This new CIR value $c_2$ is used in the subsequent equalizer tap computations in the manner described above. The process then proceeds to 503 as described above.

Any of at least four different approaches can be used for the calculation of the phase correction factor g. In a first approach, let $C_m$ be the m-th initial CIR path that was chosen to be locked on. The main-path phase $\Phi_n$ can be calculated according to a feed-forward approach as:

$$\Phi_n = \text{angle}\{C_m\}$$

$$g = e^{-j\Phi n}$$

Figure 8:
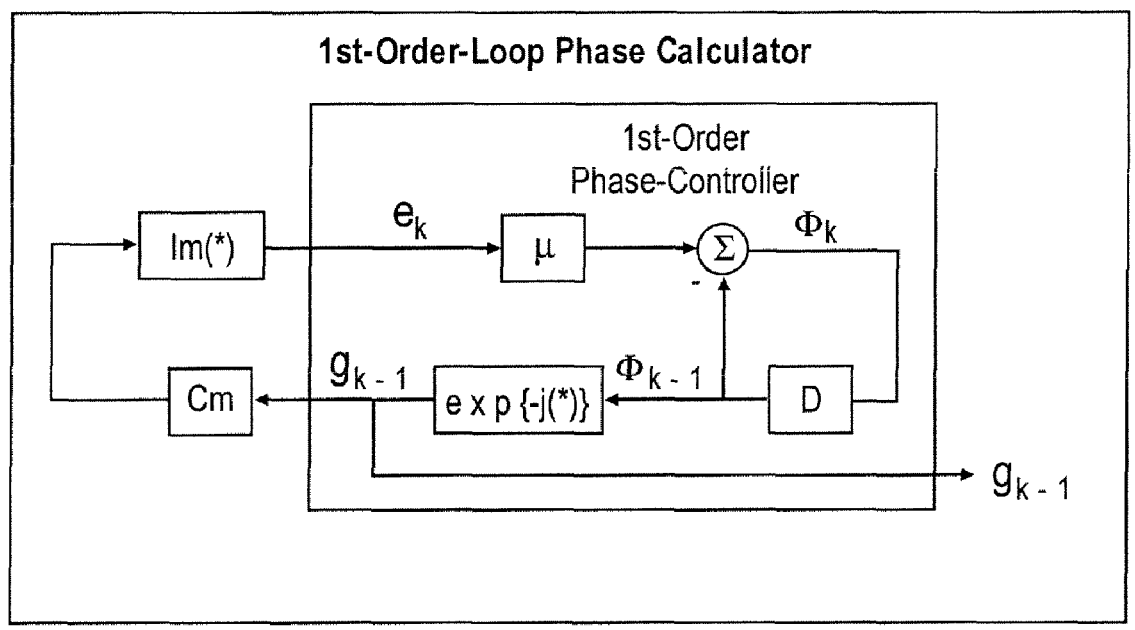
FIGS. 8-10 illustrate three different techniques for calculating a phase correction factor.

In a second approach, a feedback approach is used by applying a closed-loop first-order phase controller, as follows:

Actual path-value after correction: $C_m \cdot g_{k-1}$
k-th iteration loop error: $e_k = \text{Im}\{C_m \cdot g_{k-1}\}$
where $\text{Im}\{X\}$ is the imaginary part of the complex number X.
k-th iteration Controller phase-correction: $\Phi_k$
$\Phi_k = \Phi_{k-1} + \mu \cdot e_k$,
where $\mu$ is a positive control parameter that controls gain of the feedback loop.
$g_{k-1} = e^{-j\Phi k-1}$, k=1, 2, ... K An example of this approach is shown in FIG. 8, which shows a closed-loop phase-controller calculator that may be implemented in unit 110 (FIG. 7).

A third approach is a feedback approach in which the calculation of g is performed by the use of LMS:

Desired path-value: $d=|C_m|$.
Actual path-value after correction: $C_m \cdot g_{k-1}$
k-th iteration error: $e_k = d - C_m \cdot g_{k-1} = |C_m| - C_m \cdot g_{k-1}$
$g_k = g_{k-1} + \mu \cdot e_k \cdot C_m^* = g_{k-1} + \mu \cdot (|C_m| - C_m \cdot g_{k-1}) \cdot C_m^*$, k=1,2,...K where "$C_m^*$" represents the complex conjugate of $C_m$.

Figure 9:
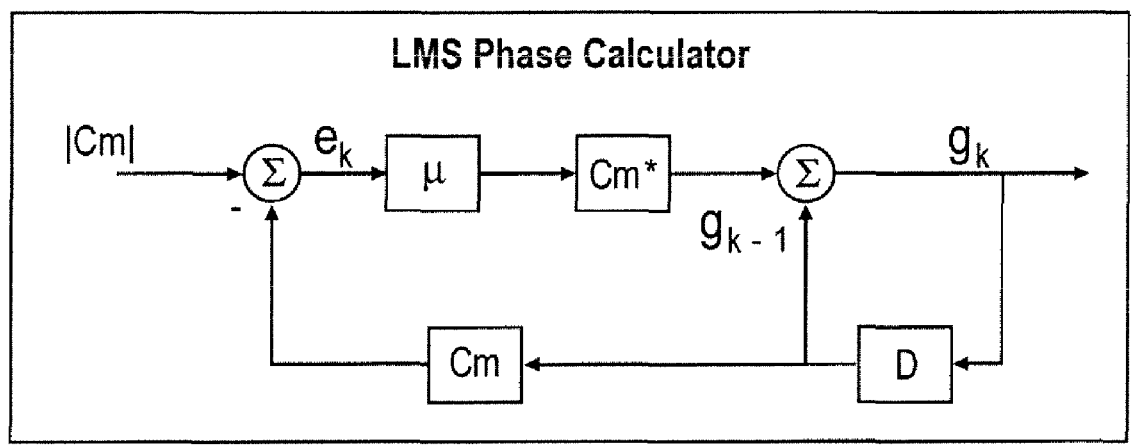

An example of this approach is shown in FIG. 9, which shows another closed-loop phase-controller calculator that may be implemented in unit 110.

A fourth approach is based on normalization of $C_m^*$. By multiplying $C_m$ with its conjugate, the phase is already corrected. The remaining issue is to normalize the correction factor so that its absolute value is 1. Assuming that $0 < |C_m^*| < 2^0.5$, a correction value can be iteratively achieved. The normalization can be performed according to the following equations:

$$g_0 = C_m^*$$

$$g_k = g_{k-1} \cdot (2 - |g_{k-1}|^2) k=1, 2, 3 \ldots K$$

Figure 10:
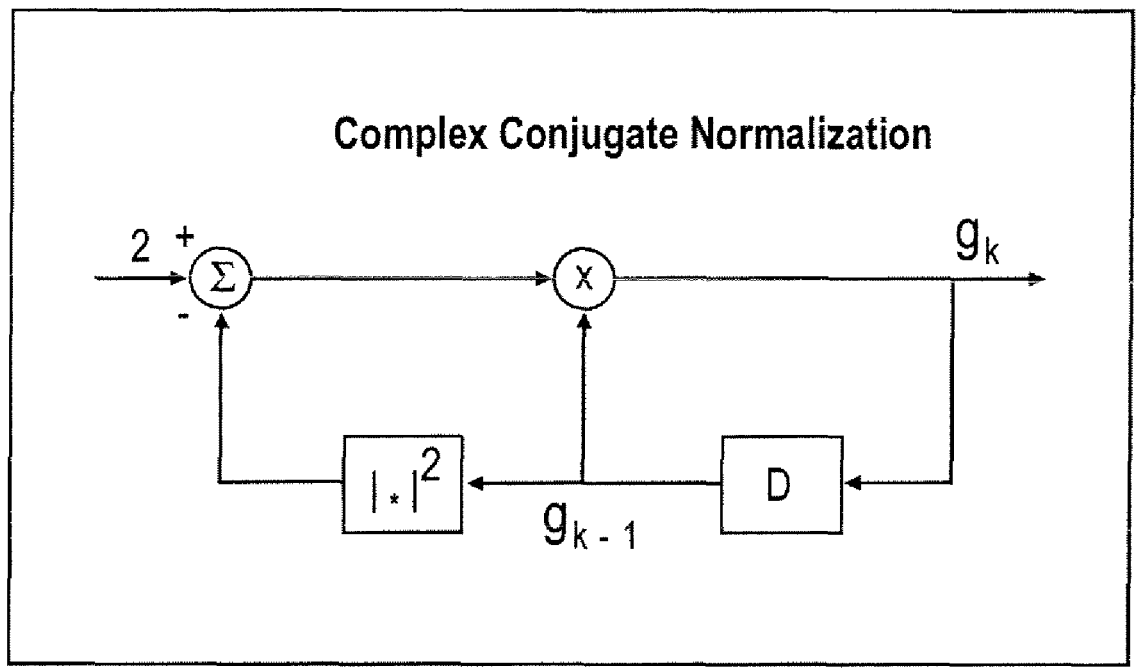

An example of this approach is shown in FIG. 10, which shows yet another closed-loop phase-controller calculator that may be implemented in unit 110.

Thus, a method and apparatus for fast training equalization of a VSB signal, by using an adaptive-iterative algorithm with main path phase correction, have been described.

The technique introduced above can be implemented in special-purpose hardwired circuitry, in software, or in a combination of special-purpose hardwired circuitry and software. Special-purpose hardwired circuitry may be in the form of, for example, one or more application-specific integrated circuits (ASICs), programmable logic devices (PLDs), field-programmable gate arrays (FPGAs), etc. Software embodying the techniques described above can be executed by one or more programmable general-purpose or special-purpose microprocessors and/or one or more programmable digital signal processors.

Software to implement the technique introduced here may be stored on a machine-readable medium and may be executed by one or more general-purpose or special-purpose programmable microprocessors. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    inputting a pre-equalized signal which has associated therewith a main path and at least one ghost path;
    computing a set of equalizer tap values during a signal acquisition phase by applying an algorithm iteratively to a set of training data contained within the pre-equalized signal, including performing a plurality of adaptation steps and applying a phase correction, the phase correction being computed for the main path only, to the pre-equalized signal at each of the adaptation steps to correct for phase error related to the main path only; and
    using the set of equalizer tap values to perform signal equalization during the signal acquisition phase.

2. A method as recited in claim 1, wherein the set of tap values comprises tap coefficients for a feed forward equalizer and for a decision feedback equalizer.

3. A method as recited in claim 1, wherein the signal is a VSB signal containing a plurality of segments, each segment containing a plurality of symbols, and wherein said set of training data comprises a training sequence contained within a single segment of the plurality of segments.

4. A method as recited in claim 1, wherein the signal is a VSB signal containing a plurality of segments, each segment containing a plurality of symbols, and wherein said set of training data comprises an average of training sequences contained within two or more segments of the plurality of segments.

5. A method as recited in claim 1, wherein the algorithm comprises an LMS algorithm.

6. A method as recited in claim 1, further comprising:
computing a set of equalizer tap values during a signal tracking phase by applying an algorithm iteratively to a set of Viterbi decisions; and
using the set of equalizer tap values and phase values to process the signal during the signal tracking phase.

7. A method as recited in claim 1, wherein each of the adaptation steps includes:
computing an initial channel impulse response of the pre-equalized signal based on the set of training data;
determining the main path;
computing a phase correction term for the main path;
correcting a phase of the pre-equalized signal by the phase correction term; and
computing a second channel impulse response of the pre-equalized signal as corrected by the phase correction term.

8. A method as recited in claim 7, wherein each of the adaptation steps further includes:
computing an estimated noise variance based on the set of training data; and
iteratively executing a sub-process until a computed error signal is determined to be smaller than a threshold or a predetermined number of iterations have been performed.

9. A method as recited in claim 8, wherein the sub-process includes:
computing a model filter output signal based on the second channel impulse response and the estimated noise variance,
computing the error signal as a difference between a reference signal and the model filter output signal, and
determining whether the error signal is smaller than the threshold or the predetermined number of iterations have been performed.

10. A method as recited in claim 1, wherein each of the adaptation steps includes:
iteratively executing a sub-process until a computed error signal is determined to be smaller than a threshold or a predetermined number of iterations have been performed.

11. A method as recited in claim 10, wherein the sub-process includes:
computing a model filter output signal based on the set of training data,
computing the error signal as a difference between a reference signal and the model filter output signal, and
determining whether the error signal is smaller than the threshold or the predetermined number of iterations have been performed.

12. A method comprising:
receiving a pre-equalized VSB signal which has associated therewith a main path and at least one ghost path; and
adapting an equalizer in the VSB receiver during a process of acquiring the VSB signal, including calculating a set of tap values for the equalizer by performing a plurality of adaptation steps to a set of training data in the VSB signal, and applying a phase correction, the phase correction being computed for the main path only, to the pre-equalized VSB signal at each of the adaptation steps to correct for phase error related to the main path only.

13. A method as recited in claim 12, wherein said performing a plurality of adaptation steps comprises using an LMS algorithm.

14. A method as recited in claim 12, wherein the VSB signal contains a plurality of multi-symbol segments, and wherein the set of training data comprises a training sequence contained within a single segment of the plurality of segments of the VSB signal.

15. A method as recited in claim 12, wherein the VSB signal contains a plurality of multi-symbol segments, and wherein the set of training data comprises an average of training sequences contained within two or more segments of the plurality of segments of the VSB signal.

16. A method as recited in claim 12, further comprising:
operating iteratively on a set of Viterbi decoder decisions during a process of tracking the VSB signal; and
using a result of said operating iteratively on a set of Viterbi decoder decisions, to determine the set of tap values for the equalizer and phase correction, during the process of tracking the VSB signal.

17. A method as recited in claim 12, wherein each of the adaptation steps includes
computing an initial channel impulse response of the pre-equalized VSB signal based on the set of training data;
determining the main path;
computing a phase correction term for the main path;
correcting a phase of the pre-equalized VSB signal by the phase correction term; and
computing a second channel impulse response of the pre-equalized VSB signal as corrected by the phase correction term.

18. A method as recited in claim 17, wherein each of the adaptation steps further includes:
computing an estimated noise variance based on the set of training data; and
iteratively executing a sub-process until a computed error signal is determined to be smaller than a threshold or a predetermined number of iterations have been performed.

19. A method as recited in claim 18, wherein the sub-process includes:
computing a model filter output signal based on the channel impulse response and the estimated noise variance,
computing the error signal as a difference between a reference signal and the model filter output signal, and
determining whether the error signal is smaller than the threshold or the predetermined number of iterations have been performed.

20. A method as recited in claim 12, wherein each of the adaptation steps includes
iteratively executing a sub-process until a computed error signal is determined to be smaller than a threshold or a predetermined number of iterations have been performed.

21. A method as recited in claim 20, wherein the sub-process includes:
computing a model filter output signal based on the set of training data,
computing the error signal as a difference between a reference signal and the model filter output signal, and
determining whether the error signal is smaller than the threshold or the predetermined number of iterations have been performed.

22. A signal equalizer comprising:
- a first equalizer unit to receive an input signal and to generate a first output by applying a first tap value, the input signal having associated therewith a main path and at least one ghost path;
- a background adaptive-iterative equalization unit to compute the first tap value during a signal acquisition phase, by applying an algorithm iteratively to a set of training data in the input signal, including performing a plurality of adaptation steps; and
- a phase correction unit to apply a phase correction, the phase correction being computed for the main path only, to a pre-equalized version of the input signal at each of the adaptation steps to correct for phase error related to the main path only.

23. A signal equalizer as recited in claim 22, wherein the first equalizer unit is a feed forward equalizer.

24. A signal equalizer as recited in claim 23, further comprising:
- a decision feedback equalizer to generate a second output by applying a second tap value; and
- a Viterbi decoder to generate Viterbi decisions as a function of the first output and the second output;
- wherein the background adaptive-iterative equalization unit further is to compute the second tap value during the signal acquisition phase, by applying the algorithm iteratively to the set of training data in the input signal.

25. A signal equalizer as recited in claim 24, further comprising:
- a blind equalization adapter unit to compute the first tap value and the second tap value during a signal tracking phase.

26. A signal equalizer as recited in claim 24, wherein the input signal is derived from a VSB signal containing a plurality of segments, each segment containing a plurality of symbols, and wherein said set of training data comprises a training sequence from a single segment of the plurality of segments.

27. A signal equalizer as recited in claim 24, wherein the signal is derived from VSB signal containing a plurality of segments, each segment containing a plurality of symbols, and wherein said set of training data comprises an average of training sequences from two or more segments of the plurality of segments.

28. A signal equalizer as recited in claim 22, wherein the input signal is derived from a VSB signal containing a plurality of segments, each segment containing a plurality of symbols, and wherein said set of training data comprises a training sequence from a single segment of the plurality of segments.

29. A signal equalizer as recited in claim 22, wherein the signal is derived from VSB signal containing a plurality of segments, each segment containing a plurality of symbols, and wherein said set of training data comprises an average of training sequences from two or more segments of the plurality of segments.

* * * * *

UNITED STATES PATENT AND TRADEMARK OFFICE
CERTIFICATE OF CORRECTION

PATENT NO. : 8,073,046 B2
APPLICATION NO. : 11/820006
DATED : December 6, 2011
INVENTOR(S) : Cohen et al.

It is certified that error appears in the above-identified patent and that said Letters Patent is hereby corrected as shown below:

On the Title Page, Item (56), under "OTHER PUBLICATIONS", in Column 2, Line 2, delete "Lawerence" and insert -- Lawrence --, therefor.

On Title Page 2, Item (56), under "OTHER PUBLICATIONS", in Column 1, Line 10, delete "Transmision," and insert -- Transmission, --, therefor.

On Title Page 2, Item (56), under "OTHER PUBLICATIONS", in Column 1, Line 11, delete "Montreuz" and insert -- Montreux --, therefor.

In Column 12, line 26, in Claim 17, delete "includes" and insert -- includes: --, therefor.

Signed and Sealed this
Fifth Day of February, 2013

Teresa Stanek Rea
*Acting Director of the United States Patent and Trademark Office*